United States Patent [19]

Ito et al.

[11] Patent Number: 4,989,955
[45] Date of Patent: Feb. 5, 1991

[54] LIQUID CRYSTAL ELECTRO-OPTICAL ELEMENT AND PROCESS FOR PREPARATION THEREOF

[75] Inventors: Kokichi Ito, Funabashi; Takamasa Harada, Inba; Koichiro Oka, Ibaraki; Hiroyuki Ikeuchi, Kyoto, all of Japan

[73] Assignees: Toray Industries, Inc.; Seiko Instruments & Electronics Ltd., both of Tokyo, Japan

[21] Appl. No.: 267,704

[22] Filed: Nov. 4, 1988

Related U.S. Application Data

[63] Continuation of Ser. No. 910,573, Sep. 23, 1986, abandoned.

[30] Foreign Application Priority Data

Sep. 25, 1985 [JP] Japan .................. 60-211400
Oct. 4, 1985 [JP] Japan .................. 60-220421
Oct. 17, 1985 [JP] Japan .................. 60-232036

[51] Int. Cl.$^5$ ............................. G02F 1/133
[52] U.S. Cl. .................................... 350/344
[58] Field of Search ............... 350/331 R, 344, 343, 350/347 E; 528/100

[56] References Cited

U.S. PATENT DOCUMENTS

| | | |
|---|---|---|
| 3,102,043 | 8/1963 | Winthrop et al. . |
| 3,342,775 | 9/1967 | Aelony et al. .......................... 260/47 |
| 3,506,598 | 4/1970 | Groff et al. . |
| 3,785,721 | 1/1974 | Harsch .......................... 350/347 E |
| 4,165,157 | 8/1979 | Kobale et al. ................... 350/344 X |
| 4,214,068 | 7/1980 | Shreurs et al. ................... 528/100 X |
| 4,228,574 | 10/1980 | Culley et al. ................ 350/331 R X |
| 4,243,794 | 1/1981 | White et al. . |
| 4,251,426 | 2/1981 | McClure et al. . |
| 4,269,760 | 5/1981 | Wakimoto et al. . |
| 4,362,771 | 12/1982 | Umeda et al. ................... 350/344 X |
| 4,367,924 | 1/1983 | Clark et al. . |
| 4,390,245 | 6/1983 | Shimizu et al. ...................... 350/344 |
| 4,542,202 | 9/1985 | Takeuchi et al. ............... 528/100 X |
| 4,563,059 | 1/1986 | Clark et al. . |
| 4,588,617 | 5/1986 | Oka . |

FOREIGN PATENT DOCUMENTS

| | | |
|---|---|---|
| 0050357 | 4/1982 | European Pat. Off. . |
| 0131216 | 1/1985 | European Pat. Off. . |
| 0149899 | 7/1985 | European Pat. Off. . |
| 56-107216 | 8/1981 | Japan . |
| 57-20931 | 2/1982 | Japan . |
| 57-29031 | 2/1982 | Japan . |
| 58-97023 | 6/1983 | Japan . |
| 2102977 | 2/1983 | United Kingdom ................ 350/344 |

OTHER PUBLICATIONS

Savla, "Epoxy Resin Adhesives", *Handbook of Adhesives*, editor: Skiest, pp. 434–445, Van Nostrand Reinhold Company, N.Y., 1977.
Chemical Abstracts, vol. 85, No. 20, Nov. 1976, p. 44, abstract No. 144075f, Columbus, Ohio, U.S.; and JP-A-76 79 157 (Kansai Paint Co., LTD) 09-07-1975.
Patent Abstracts of Japan, vol. 6, No. 92, (P-119) [970], May 29, 1982; and JP-A-57 29 031, (Nissan Jidosha K.K.) 16-02-1982 *Abstract*.

*Primary Examiner*—Stanley D. Miller
*Assistant Examiner*—Anita Pellman Gross
*Attorney, Agent, or Firm*—Armstrong, Nikaido, Marmelstein, Kubovcik & Murray

[57] ABSTRACT

In an electro-optical element comprising a liquid crystal, such as a smectic liquid crystal, sealed between two substrates arranged to confront each other with a space of an order of $\mu$m, if spacer particles for regulating the space between the substrates and phenol type curing agent-incorporated epoxy resin adhesive particles for moderating stresses generated by distortions or warps of the substrates are arranged in the space between the substrates, a minute uniform space, especially a uniform space of 1 to 3 $\mu$m effective for a ferroelectric liquid crystal, can be maintained between the substrates. In this structure, alignmental films are not disturbed at all. Furthermore, even if a nematic or super-twist liquid crystal is used, a uniform space can be stably maintained between the substrates.

12 Claims, 3 Drawing Sheets (A)

(B)

(C)

(A)

(B)

LIQUID CRYSTAL ELECTRO-OPTICAL ELEMENT AND PROCESS FOR PREPARATION THEREOF

This application is a continuation of application Ser. No. 910,573 filed Sept. 23, 1986, now abandoned.

BACKGROUND OF THE INVENTION

1. Field of the Invention

The present invention relates to an electro-optical element comprising a liquid crystal, such as a smectic liquid crystal or nematic liquid crystal, which is inserted and gripped between two substrates. More particularly, the present invention relates to an electro-optical element having a uniform space of an order of $\mu m$ and a process for the preparation thereof. Furthermore, the present invention relates to a technique of securing two substrates, between which a liquid crystal is sealed, by a spot adhesive.

2. Description of the Related Art

A liquid crystal electro-optical element comprises two glass substrates having formed on the surfaces thereof a driving transparent electrode film and an oriented film for arranging molecules of a liquid crystal, which are arranged to confront each other with a certain space therebetween, and a liquid crystal sealed in the space.

A liquid crystal electro-optical element utilizing a ferroelectric liquid crystal showing a chiral smectic C phase has recently been developed (see, for example, Japanese Unexamined Patent Publication No. 56-107216). More specifically, a liquid crystal having a chiral smectic C phase, such as p-desiloxy-benzylidene-p'-amino-2-methylbutyl cinnamate or p-hexyloxybenzylidene-p'-amino-2-chloropropyl cinnamate, has a liquid crystal molecule arrangement having a spiral layer structure. When the liquid crystal is injected between two substrates arranged to confront each other with a space narrower than the spiral period, the liquid crystal molecules lose the spiral structure and bistable states are produced by influences of the oriented film. By utilizing the ferroelectric characteristic of the liquid crystal molecules, the bistable states are changed over to each other at a high speed by application of a voltage to drive the element. When the voltage is removed, the liquid crystal molecules retain one of the bistable states. In short, the liquid crystal has a memory characteristic.

As another known technique, there can be mentioned a technique of bonding and securing glass sheets by using an encapsulated adhesive, as disclosed in Japanese Unexamined Patent Publication No. 57-29031. However, this technique is not preferred because the bonding force of the adhesive is low and the adhesive has bad influences on a liquid crystal.

SUMMARY OF THE INVENTION

In order to realize bistable states in a liquid crystal substance having a chiral smectic C phase, it is an indispensable condition that two substrates should be held while a uniform space smaller than several $\mu m$ is maintained therebetween. However, since distortions or warps are present in the substrates per se, it is difficult to decrease the length of the space between the substrates.

For example, in a conventional structure shown in FIG. 3, spacer particles 2 having a diameter equal to the intended space length are scattered on the surface of one substrate 1 and another substrate 3 having convexities and concavities owing to warps is piled and bonded onto the substrate 1 by using a sealing material 4, as shown in FIG. 3-(A). However, after heat bonding under pressure, as shown in FIG. 3-(B), the spacer particles are destroyed in the convexities 5 of the substrate 3 while the spacer particles are separate from the substrate 3 in the concavities 6. Therefore, realization of a uniform space between substrates is very difficult.

Under this background, it is a primary object of the present invention to provide a cell structure in which two substrates are arranged in parallel to each other with a space as narrow as possible therebetween Another object of the present invention is to provide a process for the preparation of the above-mentioned cell structure.

In accordance with the present invention, these objects can be attained by (1) a liquid crystal electro-optical element comprising a liquid crystal, two substrates secured by a sealing material to confront each other and hold the liquid crystal therebetween, spacer particles dispersed and arranged between the two substrates to maintain a certain space between the substrates, oriented films present in interfaces between the liquid crystal and the substrates to line up molecules of the liquid crystal and driving means for applying a voltage to the molecules of the liquid crystal, wherein the substrates are spot-bonded to each other through adhesive particles comprising as the main component an epoxy resin having a latent curing agent incorporated therein, which are dispersed and arranged in the space between the substrates, and (2) a process for the preparation of a liquid crystal electro-optical element comprising a liquid crystal, two substrates secured by a sealing material to confront each other with a certain space and hold the liquid crystal therebetween, oriented films present in interfaces between the liquid crystal and the substrates to line up molecules of the liquid crystal and driving means for applying a voltage to the molecules of the liquid crystal, said process comprising the steps of arranging the sealing material on one substrate having an electrode and oriented film formed on the surface thereof in a peripheral edge portion thereof on the oriented film side, dispersing and arranging spacer particles having a diameter equal to an intended space length and adhesive particles comprising as the main component an epoxy resin having a latent curing agent incorporated therein, which have a particle size larger than the diameter of the spacer particles, on the surface of one substrate, bonding the two substrates by heat-pressing the substrates in the piled state, and sealing the liquid crystal in the space between the substrates.

Figure 1:
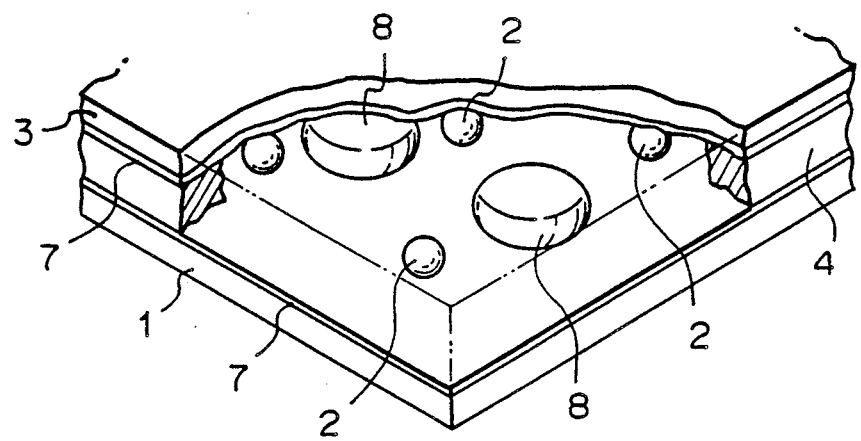
FIG. 1 is a partially cut-out perspective view showing one embodiment of the present invention.

In the drawings, each of reference numerals 1 and 3 represents a substrate, reference numeral 2 indicates spacer particles, reference numeral 4 represents a sealing material, reference numeral 7 represents an alignmental film, reference numeral 8 indicates adhesive particles of a latent curing agent-containing epoxy resin, reference numeral 8' indicates adhesive particles of a latent curing agent-containing epoxy resin before bonding, and reference numeral 9 represents a transparent electrode.

DESCRIPTION OF THE PREFERRED EMBODIMENTS

The present invention will now be described in detail with reference to the accompanying drawings.

FIG. 1 is a partially cut-out perspective view showing the basic structure of the present invention. Each of reference numerals 1 and 3 represents a glass substrate having a transparent electrode (not shown) and an alignmental film 7, which are formed on the surface thereof. Spherical or polygonal fine particles 2 (hereinafter referred to as "spacer particles") composed of a heat-resistant material are uniformly dispersed to define the length of a space between the substrates 1 and 3, and these substrates are heat-bonded in the state attracted to each other by a sealing material 4 arranged in the peripheral edge portion of the substrate 1 and adhesive particles 8 composed of a latent curing agent-containing epoxy resin, whereby a cell is constructed.

The epoxy resin adhesive particles are crushed, and they act as a cushion for preventing the spacer particles from being destroyed by the convexities or the substrates and serve to attract the concavities of the substrate toward the confronting substrate by bonding, whereby a uniform space is realized between the two substrates.

When a phenolic curing agent, especially an adduct of a bisphenol glycidyl ether or a condensation product thereof and a polyhydric phenol compound, particularly a bisphenol, is used as the latent curing agent, the latent curing agent is sufficiently compatible with the epoxy resin and a high bonding force can be attained, and contamination or destruction of the alignmental film can be effectively prevented.

Preferably, the epoxy resin adhesive particles have a spherical shape. In general, where the particles are used in an amount of 0.1 to 50 mg per 100 cm$^2$ of the substrates, a strong adhesion is achieved and their existance is imperceptible in the image of the liquid crystal electro-optical element.

When a liquid crystal substance having a chiral smectic C phase is injected into the cell having the above-mentioned structure, the liquid crystal flows into gaps defined by the spacer particles 2 and the epoxy resin adhesive particles 8 and the space is filled with the liquid crystal. Accordingly, even if an external force is applied to the cell, the uniform space is maintained between the substrates by the spacer particles 2 and epoxy resin adhesive particles 8, and since these particles act as hindering members, flow of the liquid crystal substance is blocked. Of course, the spacer particles 2 and epoxy resin adhesive particles 8 are composed of materials having no bad influences on the behavior of the liquid crystal and the distribution densities of the particles are small, and therefore, bad influences are not imposed on displayed pictures by the presence of these particles.

The process for the preparation of the above-mentioned cell will now be described with reference to FIG. 2.

A glass substrate 1 having a transparent electrode 9 and an alignmental film 7, formed thereon, is horizontally arranged so that the front surface is on the oriented film side, and a heat-melt-bondable sealing material 4 is coated in a certain thickness larger than the cell thickness in the peripheral edge portion of the front surface of the substrate 1. Spacer particles 2 of aluminum oxide having a diameter equal to the intended cell thickness and adhesive particles 8' of a latent curing agent-containing epoxy resin of the B stage, which have a diameter larger than the intended cell thickness and almost equal to the seal thickness, are dispersed on the surface of the substrate 1 in a region surrounded by the sealing material 4 [see FIG. 2-(A)].

Another substrate 3 is piled on the substrate 1 so that the side of the alignmental film 7 is located below, and the two substrates 1 and 2 are arranged in parallel with a certain space therebetween through the sealing material 4 of the lower substrate 1 and the epoxy resin adhesive particles 8' [see FIG. 2-(B)].

In this state, a pressure P is applied to the upper and lower two substrates 1 and 3 and the assembly is heated at a temperature softening the sealing material 4 and the particles 8' of the latent curing agent-containing epoxy resin of the B stage, that is, the semi-cured stage. At this point, the sealing material 4 and the epoxy resin adhesive particles 8' begin to soften. The epoxy resin adhesive particles 8' uniformly receive the pressure p and are crushed flat while they are fusion-bonded to the glass substrate 1 and 3. When the upper glass substrate 3 thus abuts against the spacer particles 2, the two glass substrates 1 and 3 are supported by the spacer particles 1 and 3 and the movement of the substrates 1 and 3 is stopped in such a state that the substrates 1 and 3 are arranged in parallel to each other and a space corresponding to the diameter of the spacer particles 2 is held between the substrates [see FIG. 2-(C)].

In the above-mentioned structure, even if there are present certain convexities and concavities (ordinarily about 20 to about 30 $\mu$m) on the substrates 1 and 3, by effecting bonding by pressing under heating, a certain distance can be maintained between the substrates. Namely, the convexities and concavities of about 20 to about 30 $\mu$m can be corrected.

If heating is continued in this state, the adhesive particles 8 of the epoxy resin are crushed flat and are cured in the state fusion-bonded to the two substrates 1 and 3.

The two substrates 1 and 3 are secured while they receive a force of attracting them to each other by the sealing material 4 and the epoxy resin adhesive particles 8 but the inward movement is regulated by the spacer particles 2, whereby a cell is formed.

The epoxy resin adhesive particles 8 exert a cushioning action at the press-bonding step and prevent the spacer particles 8 from being crushed and broken by convexities of the undulated substrates.

Furthermore, since the epoxy resin adhesive particles 8 comprises a latent curing agent, a contaminant reaction gas is not generated at the curing reaction and hence, the oriented film is not deteriorated. Accordingly, an electro-optical element having a good contrast ratio can be obtained. Moreover, since the epoxy resin adhesive particles 8 are chemically stable, the liquid crystal is not modified or deteriorated even if the liquid crystal is used for a long time, and the durability characteristic is highly improved.

In the present invention, it is preferred that the liquid crystal be a smectic liquid crystal, because the response speed to the voltage is high and the picture image is clear. In order to attain the objects of the present invention, it is preferred that the smectic liquid crystal be a ferroelectric liquid crystal having a spiral molecular arrangement structure. In case of a ferroelectric liquid crystal, it is most preferred that the space between the substrates be 1 to 3 μm. If the liquid crystal is a cholesteric, super-twist or nematic crystal, the space between the substrates is 3 to 20 μm.

For the liquid crystal substrate, compounds of the following formula and combinations thereof are also useful. As the chiral smectic C, in addition to the compounds as described on page 2, lines 6 and 7, the following compounds may be advantageously used alone or as a mixture of two or more thereof. These compounds are disclosed in "Technical Reports in the Television Society", Feb. 3, 1986, ED 917, IPD 104-1.

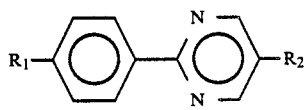

$R_1$ and $R_2$ are as listed in the Table below. In the Table, the asterisked carbon atoms are asymmetric carbon atoms.

TABLE

| No. | $R_1$ | $R_2$ |
|---|---|---|
| 1 | $CH_3$<br>\|<br>$C_2H_5\overset{*}{C}H(CH_2)_5O-$ | $n\text{-}C_8H_{17}-$ |
| 2 | $n\text{-}C_8H_{17}-$ | $CH_3$<br>\|<br>$C_2H_5\overset{*}{C}H(CH_2)_5O-$ |
| 3 | $n\text{-}C_8H_{17}O-$<br>$CH_3$ | $CH_3$<br>\|<br>$C_2H_5\overset{*}{C}H(CH_2)_5-$ |
| 4 | $C_2H_5\overset{*}{C}H(CH_2)_4COO-$ | $n\text{-}C_8H_{17}-$ |
| 5 | $CH_3$<br>\|<br>$C_2H_5\overset{*}{C}H(CH_2)_5O-$ | $n\text{-}C_8H_{17}O-$ |
| 6 | $CH_3$<br>\|<br>$C_2H_5\overset{*}{C}H(CH_2)_4COO-$ | $n\text{-}C_8H_{17}O-$ |
| 7 | $CH_3$<br>\|<br>$C_2H_5\overset{*}{C}H(CH_2)_5O-$ | $n\text{-}C_8H_{17}OC-$<br>\|\|<br>$O$ |
| 8 | $n\text{-}C_8H_{17}O-$ | $CH_3$<br>\|<br>$C_2H_5\overset{*}{C}H(CH_2)_4OC-$<br>\|\|<br>$O$ |
| 9 | $n\text{-}C_{11}H_{23}O-$ | $CH_3$<br>\|<br>$C_2H_5\overset{*}{C}HCH_2O-$ |
| 10 | $n\text{-}C_{10}H_{21}CO-$<br>\|\|<br>$O$ | $CH_3$<br>\|<br>$C_2H_5\overset{*}{C}HCH_2O-$ |
| 11 | $CH_3$<br>\|<br>$C_2H_5\overset{*}{C}HCH_2O-$ | $n\text{-}C_{11}H_{23}O-$ |
| 12 | $CH_3$<br>\|<br>$C_2H_5\overset{*}{C}H(CH_2)_2O-$ | $n\text{-}C_8H_{17}O-$ |
| 13 | $CH_3$<br>\|<br>$C_2H_5\overset{*}{C}H(CH_2)_2O-$ | $n\text{-}C_{11}H_{23}O-$ |
| 14 | $CH_3$<br>\|<br>$C_2H_5\overset{*}{C}HCO-$<br>\|\|<br>$O$ | $n\text{-}C_8H_{17}O-$ |
| 15 | $CH_3$<br>\|<br>$C_2H_5\overset{*}{C}HCOO-$ | $n\text{-}C_{11}H_{23}O-$ |
| 16 | $CH_3$<br>\|<br>$C_2H_5\overset{*}{C}HCH_2CO-$<br>\|\|<br>$O$ | $n\text{-}C_8H_{17}O-$ |
| 17 | $CH_3$<br>\|<br>$C_2H_5\overset{*}{C}HCH_2CO-$<br>\|\|<br>$O$ | $n\text{-}C_{11}H_{23}O-$ |
| 18 | $CH_3$<br>\|<br>$C_2H_5\overset{*}{C}H(CH_2)_2CO-$<br>\|\|<br>$O$ | $n\text{-}C_8H_{17}O-$ |

In the present invention, it is preferred that the epoxy resin adhesive particles should have a deformed spherical shape pressed by the pressure given by the two substrates, because the oriented film or electroconductive film is not damaged.

In the present invention, the substrate is preferably a glass sheet, because the glass sheet is excellent in the transparency and hardness Furthermore, the substrate may be a plastic sheet, and the plastic sheet is safe and light. Plastics excellent in the transparency, such as polymethyl methacrylate and polycarbonate, are preferred. In order to improve the abrasion resistance, it is preferred that a hard coat layer of silica, epoxysilane, organic polysiloxane or crosslinked polyacrylate be formed on the surface of the plastic sheet to be exposed to the outer air. Furthermore, a silica-containing layer is preferably formed to impart a reflection-preventing property to the outermost layer to be contacted with the outer atmosphere. Of course, a reflection-preventing hard coat layer may be formed.

In the present invention, an unoriented or monoaxially oriented film may be used at least as the upper substrate. The reason is that in the case where the surface of the panel (display) is convexly curved, an iridescent pattern is not found even if seen obliquely. The direction of the monoaxial orientation may be longitudinal or lateral. The orientation degree is such that the draw ratio is about 1.5 to about 7, preferably 5 to 6.

An acetate film is preferred as the unoriented film, and any of known drawn resin films can be used but a polyethylene terephthalate film is preferred as the uniaxially oriented film. The polyethylene terephthalate film has a high melting point and is stable to liquid crystals and can be used for a long time. Furthermore, the polyethylene terephthalate film is advantageous in that the cost is cheap. The thickness of the film is not particularly critical, so far as the thickness is enough to form a panel.

It is indispensable that an electroconductive layer should be formed on the film so as to give charges to the liquid crystals. Any of known electroconductive layers can be used, but an electroconductive layer composed of indium oxide and tin oxide is preferred. This electroconductive layer can be formed by vacuum evaporation deposition, sputtering or ion plating (inclusive of the ion assist method) of metals in an oxidizing atmosphere.

As is apparent from the foregoing description, according to the present invention, since two substrates are secured and bonded by adhesive particles of a latent curing agent-containing epoxy resin in the state where spacer particles having a diameter equal to an intended space are dispersed between the two substrates, the space can be defined at many points by the spacer particles in the state where inwardly attracting forces are given to the substrates by many epoxy resin adhesive particles, and inherent distortions of the substrates can be corrected and a parallel cell structure can be formed. Accordingly, even if an external force is applied, the uniform space can be maintained and downward flow of the liquid crystal can be prevented. Moreover, since the space between the substrates is regulated by the spacer particles and epoxy resin adhesive particles, a minute uniform space can be maintained irrespectively of the areas of the substrates and a liquid crystal panel having a large area can be realized. Moreover, since a phenolic curing agent is used, no contaminant gas is generated and the orientation of the liquid crystal is not disturbed.

The present invention will now be described in detail with reference to the following examples that by no means limit the scope of the invention.

EXAMPLE 1

An epoxy resin adhesive liquid was coated in a thickness of about 7 $\mu$m on the surface of the peripheral region of a glass substrate having a transparent electrode coat layer and a rubbed or unrubbed polyimide coat layer as an alignmental film to form a sealing portion. An epoxy type spherical particulate adhesive (having a composition described below) having a diameter of 5.5 $\mu$m and fine particles of alumina having a diameter of 2 $\mu$m were scattered at predetermined densities (for example, 200 particles per mm$^2$) on the inner region surrounded by the sealing portion. Another glass substrate was piled on the glass substrate, and the assembly was heated at an elevated temperature (for example, 80 to 200° C.) under a pressure (for example, 0.3 to 5 Kg/cm$^2$). A cell structure comprising the glass substrates secured in parallel with a space of 2 $\mu$m was thus obtained.

A ferroelectric chiral smectic liquid crystal (for example, p-desiloxybenzylidene-p'-amino-2-methylbutyl cinnamate as described above) was injected into the formed cell, and the cell was driven and the ratio of the contrast at the time of transmission of light to the contrast at the time of interception of light was measured. The contrast ratio was 5.5 to 6.5. Accordingly, it was confirmed that the contrast ratio was sufficiently high and the orientation state of the liquid crystal was not disturbed.

Specific examples of the epoxy type spherical particulate adhesive are described below.

ADHESIVE 1

A polyethylene cup having a capacity of 300 cc was charged with 20 g of Epikote 828 and 20 g of Epikote 1001 as the epoxy resin, each having a commercially available bisphenol A diglycidyl ether type epoxy resin supplied by Yuka-Shell Epoxy, and 4 g of Emulsit 9 (supplied by Diichi Kogyo Seiyaku), which is a polyoxyethylene nonylphenyl ether having an HLB value of 16.2, as the surface active agent was added and 4 g (about 0.12 equivalent) of Epicure 171N (supplied by Yuka-Shell Epoxy), which is an adduct of condensed bisphenol A diglycidyl ether and bisphenol A, as the latent curing agent was added. The entire mixture was heated at 95° C. and promptly stirred to form a transparent compatible liquid.

A stirrer having a Teflon plate vane attached to the top end thereof was set in the cup, and the liquid was stirred at 800 rpm at a temperature maintained at 50° C. Then, 6 cc of water contained in a syringe and maintained at 50° C. was added and the mixture was stirred for 40 seconds. This operation was repeated 4 times. Thus, the mixture of the epoxy resin and Epicure 171 was emulsified by 24 cc of water as a whole.

A curing liquid formed by diluting 0.44 equivalent of piperazine with 32 cc of water was added to the emulsion and the mixture was gently stirred to uniformalize the emulsion.

The emulsion was allowed to stand still at 25° C. for 6 days to obtain spherical particles having an average particle size of about 6 $\mu$m.

Water classification (elutriation) was carried out to obtain such a particle size distribution that particles having a size of 5.5±2 $\mu$m occupied 95% by weight of total particles.

Silica sol (Snowtex N, solid content of 40% by weight) was added in an amount of 2.5% by weight based on the particles to the classified particle suspension, and the mixture was stirred for 30 minutes to make silica adsorbed on the particles.

The particles were recovered by suction filtration and dried at normal temperature under reduced pressure.

To measure a tear bonding strength, 0.5 mg of the particles were uniformly scattered on a square region having a side of 15 mm on a slide glass and the scattered region was covered by a slide glass having the same size as that of the above-mentioned glass. The side glasses were secured by clips and were subjected to the curing treatment for 2 hours in a hot air drier maintained at 170° C. It was found that the tear bonding strength was 40 kg/15 mm.

ADHESIVE 2

A polyethylene cup having a capacity of 300 cc was charged with 40 g of Epikote 828, 12 g (about 0.26 equivalent) of Epicure 171N as the latent curing agent and 4 g of Noigen EA137 (supplied by Daiichi Kogyo Seiyaku), which is a commercially available polyoxyethylene phenol substituted ether type surface active agent having an HLB value of 13, as the surface active agent, and they were heat-mixed at 95° C. to obtain a transparent compatible liquid. The liquid was emulsified in the same manner as described in Adhesive 1 except that the emulsifying temperature was normal temperature.

A curing liquid formed by diluting 0.3 equivalent of piperazine with 32 cc of water was added to the emulsion and the mixture was gently stirred to uniformalize the emulsion.

The emulsion was allowed to stand still at 25° C. with gentle stirring at about 1 to about 3 rpm for 4 days to obtain spherical particles having an average particle size of 6.5 μm.

In the same manner as described in Adhesive 1, water classification was carried out so that particles having a size of 5.5±2 μm occupied 95% by weight of total particles, and in the same manner as described in Adhesive 1, 1% by weight of silical was adsorbed on the particles.

After drying under reduced pressure, the particles had a tear bonding strength of 35 Kg/15 mm.

ADHESIVE 3

The following curing agents were used as the phenolic curing agent to be contained in the epoxy type spherical particulate adhesive. In each case, a good contrast ratio was obtained.
Methylon 75/08 supplied by G-E
Resimene P97 supplied by Monsanto
Varcom 1281B supplied by Varcom
Super-Beckacite supplied by Japanese Reichhold
Hitanol 4010 and Hitanol 4020 supplied by Hitachi Kasei

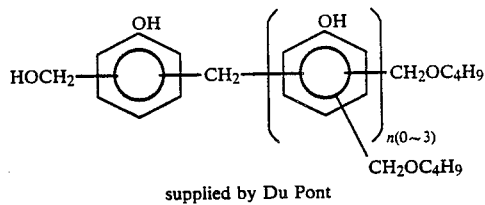

supplied by Du Pont

EXAMPLE 2

On one surface of a monoaxially oriented polyethylene terephthalate film (draw ratio of 5.5) having a thickness of 100 microns, vacuum evaporation deposition was carried out by resistance-heating an evaporation source comprising metallic indium and metallic tin (metallic tin content of 12% by weight), which was charged in a tungsten boat, under a high vacuum ($2 \times 10^{-2}$ Torr) in an oxygen atmosphere. The thickness of the obtained electroconductive coat layer was 850 Å. Then, the film was subjected to an oxidizing heat treatment at 150° C. for 20 minutes to obtain a transparent film having a sheet resistivity of 50 Ω. Then, an alignmental film was formed on the electroconductive coat layer.

Figure 2:
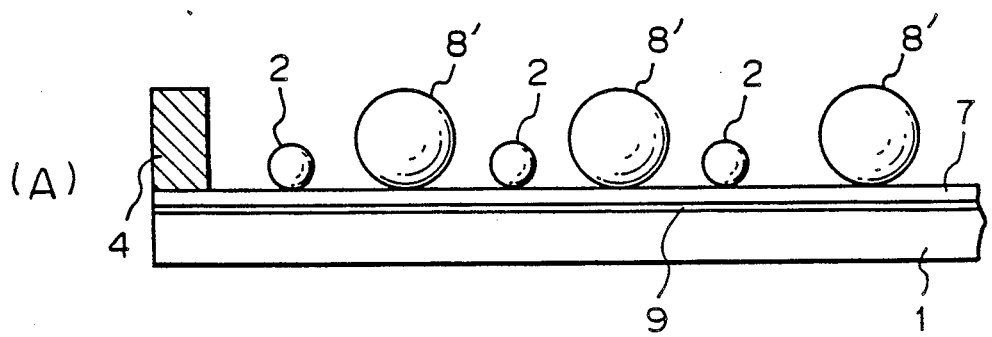
FIG. 2 (a-c) is a diagram illustrating the steps of a process for preparing a structure shown in FIG. 1.
Figure 2:
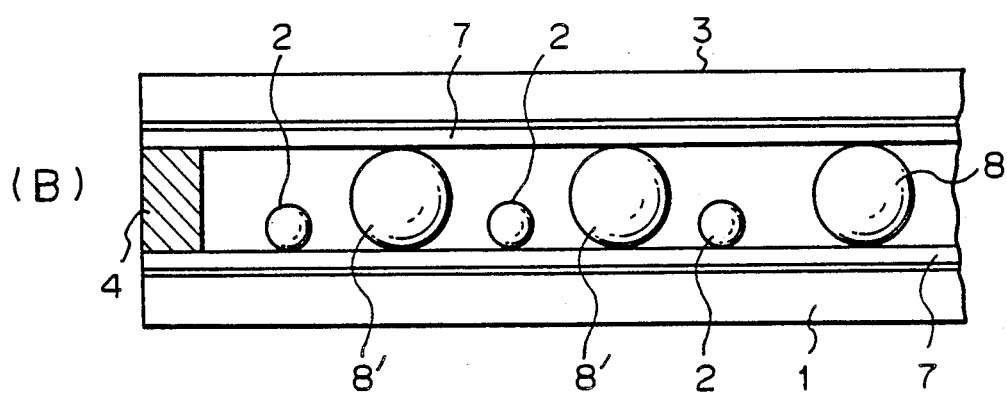
Figure 2:
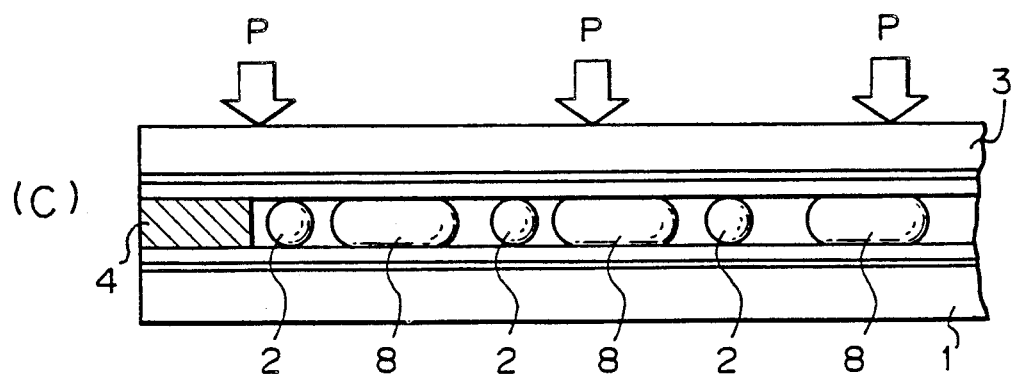
Figure 3:
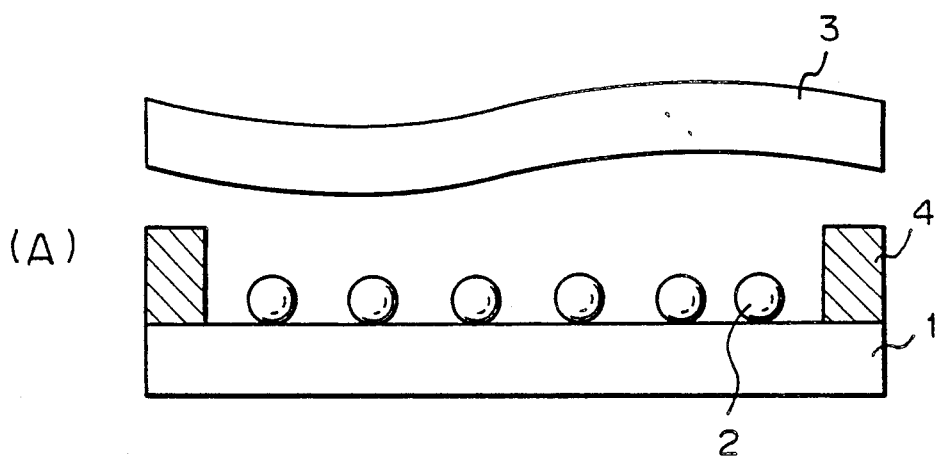
FIG. 3 (a-b) is a sectional view showing a conventional technique.
Figure 3:
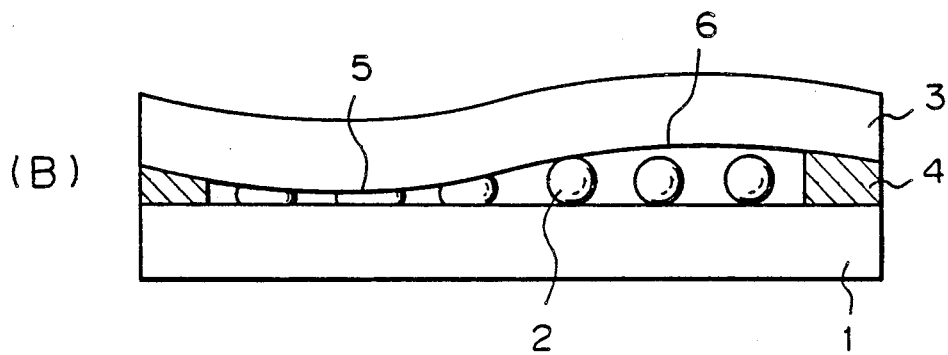

By using the so-obtained electroconductive film as the top plate, cured epoxy resin particles (having an average particle diameter of 2 μm) as the spacer and the epoxy resin spherical particulate adhesive as obtained in Adhesive 1 of Example 1 as the particulate adhesive, a liquid crystal display cell as shown in FIGS. 1 and 2 was prepared with a space of 2 μm by carrying out cure-bonding at 150° C. The electroconductive layer or the film was not damaged at all, and even if the surface was curved, no iridescent pattern was formed. In short, a good cell heretofore not obtainable could be obtained.

REFERENTIAL EXAMPLE

For comparison, a ferroelectric liquid crystal electro-optical element was prepared by using epoxy resin particles of the B stage containing an amine type latent curing agent, and the contrast ratio was measured. It was found that the contrast ratio was reduced to 3.0 to 4.0, and it was confirmed that the orientation of the liquid crystal was disturbed.

Indeterminate particles formed by heating an epoxy resin (Stractbond X-7479-50 supplied by Mitsui-Toatsu) and amine type latent curing agent at 90° C. for 30 minutes to convert it to a resin of the B stage, pulverizing the resin and classifying the particles to adjust the particle size to about 7 μm were used as the particles of the amine type latent curing agent-containing epoxy resin of the B stage.

In the foregoing examples, the spacer particles and epoxy resin adhesive particles having a spherical shape were used. Needless to say, however, similar effects can be attained even if ellipsoidal or polygonal particles are used.

In Example 1, glass substrates were used. Similar effects can be attained by using rigid heat-resistant polymeric resin plates as the substrates. Moreover, a chiral smectic liquid crystal was used in Example 1. However, other liquid crystal substances such as a smectic A liquid crystal and a nematic liquid crystal can be similarly used.

We claim:

1. A process for the preparation of a liquid crystal electro-optical element comprising a liquid crystal, two substrates secured by a sealing material to confront each other with a certain space and hold the liquid crystal therebetween, alignmental films present in interfaces between the liquid crystal and the substrates to line up molecules of the liquid crystal and the driving means for applying a voltage to the molecules of the liquid crystal, said process comprising the steps of arranging the sealing material on one substrate having an electrode and alignmental film on the surface thereof in a peripheral edge portion thereof on the alignmental film side, dispersing and arranging spacer particles having a diameter equal to an intended space length and adhesive particles comprising as the main component a partially amine cured epoxy resin containing a phenolic latent curing agent which is compatible with the epoxy resin, the adhesive particles having a particle size larger than the diameter of the spacer particles, on the surface of one substrate, bonding the two substrates by, heat-pressing the substrates in the piled state, and sealing the liquid crystal in the space between the substrates.

2. A process for the preparation of a liquid crystal electro-optical element according to claim 1, wherein the liquid crystal is a smectic liquid crystal.

3. A process for the preparation of a liquid crystal electro-optical element according to claim 1, wherein the liquid crystal is a ferroelectric liquid crystal having a spiral molecule arrangement structure and the space between the substrates is not larger than the spiral period of the liquid crystal.

4. A process for the preparation of a liquid crystal electro-optical element according to claim 1, wherein the epoxy resin adhesive particles have a deformed spherical shape pressed by the pressure between the two substrates.

5. A process for the preparation of a liquid crystal electro-optical element according to claim 1, wherein the space between the substrate is 1 to 3 μm.

6. A process for the preparation of a liquid crystal electro-optical element according to claim 1, wherein the liquid crystal is a cholesteric or nematic liquid crystal and the space between the substrates is 3 to 20 μm.

7. A process for the preparation of a liquid crystal electro-optical element according to claim 1, wherein the substrate is a glass sheet.

8. A process for the preparation of a liquid crystal electro-optical element according to claim 1, wherein the substrate is a transparent plastic sheet.

9. A process for the preparation of a liquid crystal electro-optical element according to claim 1, wherein the substrate is a monoaxially oriented film.

10. A process for the preparation of a liquid crystal electro-optical element according to claim 1, wherein the epoxy resin adhesive particles are present in an amount of 0.1 to 50 mg per 100 cm² of the substrate.

11. A process for the preparation of a liquid crystal electro-optical element according to claim 1, wherein the partially amine cured epoxy resin adhesive particles are particles comprising at least an epoxy resin as the main component, said epoxy resin contains a phenolic latent curing agent compatible therein, and said particles have an average particle size of 1 to 20 μm and have such a particle size distribution that particles having a size of from 0.5×(average particle size) to 1.5×(average particle size) occupy at least 90% by weight of total particles.

12. A process as claimed in claim 1 wherein said phenolic latent curing agent comprises an adduct of a bisphenol glyidyl ether and a polyhydric phenol.

* * * * *